US006435787B1

(12) United States Patent
John (10) Patent No.: US 6,435,787 B1
(45) Date of Patent: Aug. 20, 2002

(54) METHOD OF MAKING DUNNAGE BAGS (76) Inventor: David M. John, 315 W. 17th St., Crowley, LA (US) 70526

( * ) Notice: Subject to any disclaimer, the term of this patent is extended or adjusted under 35 U.S.C. 154(b) by 0 days.

(21) Appl. No.: 09/896,466

(22) Filed: Jun. 29, 2001

Related U.S. Application Data (62) Division of application No. 09/570,471, filed on May 12, 2000, now Pat. No. 6,322,303.

(51) Int. Cl.$^7$ ................................................. B60P 7/16
(52) U.S. Cl. ....................................... 410/119; 410/125
(58) Field of Search ................................. 410/117, 118, 410/119, 122, 125, 155; 383/25, 109, 113; 428/35.2

(56) References Cited

U.S. PATENT DOCUMENTS

| | | | | | |
|---|---|---|---|---|---|
| 3,667,625 | A | * | 6/1972 | Lucas | 410/119 |
| 3,868,026 | A | * | 2/1975 | Baxter | 410/119 |
| 4,136,788 | A | * | 1/1979 | Robbins | 410/119 |
| 5,288,188 | A | * | 2/1994 | Vance | 410/119 |
| 5,693,163 | A | * | 12/1997 | Hoover et al. | 410/119 X |
| 5,788,438 | A | * | 8/1998 | Goshorn et al. | 410/119 |
| 5,908,275 | A | * | 6/1999 | Howlett, Jr. et al. | 410/119 |
| 6,095,732 | A | * | 8/2000 | Howlett, Jr. et al. | 410/119 |
| 6,322,303 | B1 | * | 11/2001 | John | 410/119 |

FOREIGN PATENT DOCUMENTS

DE 3034563 * 3/1981 ................ 428/35.2

* cited by examiner

Primary Examiner—Stephen T. Gordon
(74) Attorney, Agent, or Firm—Joseph L. Lemoine, Jr.

(57) ABSTRACT

A method of manufacturing an inflatable dunnage bag having a wall construction of two integrally fused layers of thermoplastic polymer, the outer layer of which is a sleeve of strips of woven polymer, the inner of layer of which is a continuous layer of gas impervious polymer. The ends of the sleeve are sealed against the escape of gas. The wall of the bag has a valve for the admittance of gas to the interior of the bag. The bag is formed by deposition of a continuous molten layer of gas impervious polymer to a sleeve of strips of woven polymer, installing a valve for admittance of gas into the wall of the sleeve and forming a gas tight seal at the ends of the sleeve. Deposition of the continuous layer of gas impervious polymer may be a two-step process wherein a molten layer of gas impervious polymer is deposited to one exterior side of the flattened sleeve, then to the other exterior side of the flattened sleeve and the sleeve turned "inside-out". The ends of the bag are sealed, may be folded, the folds secured to the exterior of the bag by adhesive and a binding strip. The dunnage so manufactured is strong, lightweight, scuff resistant, moisture resistant, reusable or easily recyclable.

5 Claims, 6 Drawing Sheets

METHOD OF MAKING DUNNAGE BAGS

This patent application is a divisional application of U.S. patent application Ser. No. 09/570,471 filed May 12, 2000 and issued as U.S. Pat. No. 6,322,303.

BACKGROUND—FIELD OF THE INVENTION

In the field of transportation and shipment of goods, "dunnage bags" are frequently used. Dunnage bags are inflatable structures, typically inflated with pressurized gas, designed to be disposed in the void spaces of a cargo container or hold.

BACKGROUND—DESCRIPTION OF RELATED ART

It is well conventionally practiced in the field of cargo transportation to place dunnage bags between individual, adjacent cargo pieces, or between the individual cargo pieces and the side walls of a cargo container or hold, to fill the voids within the container or hold and thereby prevent damage to the cargo pieces or walls of the container or hold due to shifting of cargo during transportation. Because dunnage bags are subjected to forces of cargo attempting to shift, they must be resistant to rupturing or leakage in an environment where the surface of the bag will be subject to abrasion, contact with edges and corners, etc.

Previously known dunnage bags typically consist of three major components, an inflatable bladder, an outer covering and some means to inflate and/or deflate the bladder. The inflatable bladder typically consists of a sac of gas-impervious, flexible and relatively elastic material such as rubber, thermoplastic material (such as polyethylene) or the like. Surrounding the inflatable bladder is the outer covering, which typically consists of an outer bag composed of a sturdy, relatively inelastic material such a canvas, nylon or multiple layers of kraft paper. The general purposes of the outer covering is twofold, to prevent over-expansion and rupture of the inflatable liner and provide a sturdy covering which protects the inflatable bladder from damage due to abrasion, edges and corners. Finally, some means of at least inflating the inner bladder of the bag is provided, typically a one-way or check valve disposed in the wall of the bag.

The prior art has generally directed its attention to providing dunnage bags having specific constructions which either increase the strength of the bag or decrease the cost of manufacturing and/or using same.

The first dunnage bags were intended for extensive reuse. As such they were typically comprised of a heavy, durable inner bladder, such as rubber, and a heavy, durable outer covering such as canvas. Later, inner bladders and outer coverings of differing materials, such as polyethylene bladders and nylon outer coverings were used. But such bags were possessed of several disadvantages. Because of their construction such bags were heavy, expensive to manufacture, and if to be reused (which their cost nearly mandated) had to be deflated (which was time consuming and could rarely be accomplished fully with the bag in the cargo container), handled carefully, carefully packed for return to the shipper, etc. Accordingly, time, trouble and cost of using such bags was found to be prohibitively high.

In an attempt to reduce cost of dunnage bags the prior art next turned a form of disposable bag which employed a tube of gas impervious material (such as polyethylene) inside of a tube of multiple layers of more resilient material, such as kraft paper, the ends of which tube was sealed by reusable rods and clamps. This solution had several disadvantages. Manufacture of the sleeve of gas impermeable liner within a sleeve of multiple layers of more resilient material remained expensive. Also, metal clamps were expensive, were prone to leak in transit and unless positioned carefully were themselves capable of damaging dunnage bags, the cargo or its container and had to be returned to a shipper for reuse. Also, while in theory the bladder material and outer material could be separated into different streams and each separately recycled, because of the cost of labor involved in separation, used bags were frequently disposed, creating waste disposal issues.

Because of the inherent problems associated with earlier dunnage bags, later emphasis was placed on bags which were intended to be used once and disposed. As bags of this type were intended to be used only once the art endeavored to construct these bags so as to minimize the cost manufacture. A general result of this effort has been the evolution of a dunnage bag wherein the inner bladder bag consists of a relatively thin-walled thermoplastic material, such as polyethylene, which is disposed in an outer covering which consists of multiple layers of kraft paper (sometimes called "cardboard"), the ends of which are permanently sealed by an adhesive. With a dunnage bag construction of this type, the bladder serves mainly as a gas tight member while the plurality of paper sheets provide the requisite resistance to bursting, abrasion and puncture.

Such bags nevertheless have various disadvantages. They are still relatively expensive to manufacture and use. In practice they are made by first forming a thin sleeve of thermo-plastic material which will become the inflatable bladder of the bag. Then that sleeve is typically moved along an assembly line where it is wrapped with multiple layers of kraft paper which are overlapped circumferentially and glued together longitudinally forming a sleeve. In general, the greater the gas pressure the bag is designed to hold, the more layers of paper will be applied. Thereafter a desired length of the sleeve, now comprising multiple layers of kraft paper having an inner sleeve of gas impervious material, is cut to a desired length, a gas valve installed in the wall of the sleeve, and the ends of the sleeves sealed, typically by application of adhesive and folding.

Inasmuch as outer layers of such bags, which give the bag most of its resistance to bursting, abrasion or puncture, consists of paper, such bags are susceptible to moisture, and while such bags are designed to be disposed of after single use, disposal is a problem. While in theory the paper and the plastic components of the bags could be at least largely be separated and recycled appropriately, in practice that is almost never done because of labor costs involved, and separation would likely be incomplete even if attempted, because the ends of the bladder are typically glued into folds of the paper. Hence near major receiving centers disposal of dunnage bags creates waste disposal issues.

Various dunnage bag constructions of prior art are disclosed in U.S. Pat. Nos. 3,426,891; 3,442,402; 3,556,318; 3,868,026; 4,040,526; 4,553,887; 4,591,519; 5,288,188; 5,339,602; 5,437,301; 5,788,438 and 5,908,275.

The bag and method of manufacture herein disclosed is designed to address some of the disadvantages discussed above.

OBJECTS OF THE INVENTION

A principal object of the present invention is to provide a dunnage bag which has the advantages of bags of prior art, that is be capable of being inflated with and retaining gas pressure, be resistant to bursting, abrasion and puncture from edges and corners of goods, but be more economical to manufacture, have an improved strength to weight ratio, be moisture resistant, may be reused if desired and be facilely recyclable.

To these ends the objects of the invention are to provide a gas impervious dunnage bag which is comprised of low cost materials, is easily manufactured, is burst resistant, has an outer surface resistant to bursting, abrasion and damage from edges and corners of goods, is moisture resistant, is reusable and is readily recyclable.

Another object of the invention is to provide a dunnage bag, the wall of which is comprised of an outer layer of woven strips of strong thermoplastic polymeric material which is resistant to moisture, bursting, abrasion or damage by cargo edges and corners and a continuous inner layer of gas impervious thermoplastic polymeric material integrally fused to said outer layer and is therefore sturdy, lightweight, easy and economical to use, reuse and/or recycle.

Another object of the invention is to provide a bag the ends of which are sealed in a manner which is resistant to stretching, tearing, unraveling, bursting abrasion, damage by contact with cargo and is moisture resistant.

Yet other objects of the invention relate to providing a method of manufacturing the dunnage bag of the present invention in a rapid, economical and efficient manner.

Other and further objects, features and advantages of the present invention will be readily apparent to those skilled in the art when the following description of the preferred embodiments is read in conjunction with the accompanying drawings.

SUMMARY OF THE INVENTION

The above and further objects are achieved in accordance with the present invention wherein there is provided a recyclable dunnage bag for cushioning pieces of cargo during shipment, where the wall of the dunnage bag includes an inner layer comprised of a continuous film of a gas impervious polymer, which inner liner is integrally fused to the interior of an outer layer of durable woven polymer, and has a means for inflation of said dunnage bag.

Forming the dunnage bag begins with a sleeve, preferably seamless, of woven thermoplastic polymer selected for characteristics of strength, resistance to moisture, abrasion and damage by edges and corners of cargo. Then preferably to the outer surface of the sleeve a continuous layer of thermoplastic polymer selected for gas impermeability, moisture resistance and compatibility with said woven polymer is integrally fused, preferably by extrusion of a layer of molten polymer onto the surface of the woven polymer and hot compression thereto, preferably by pinch rolling. Then a desired length of the sleeve is cut, if necessary turned "inside-out" so that the woven thermoplastic polymer is on the outside of the sleeve and the continuous layer of thermoplastic polymer is on the inside of the sleeve. Then the ends of the sleeve are sealed by thermal fusion, gluing, folding and/or securing of the folds to the exterior of the dunnage bag. Either before or after reversal of the sleeve a means for admitting gas, which is preferably a "check" or one-way valve means, is installed in the wall of the bag.

BRIEF DESCRIPTION OF THE DRAWINGS

The invention will be better understood by reference to the accompanying drawings wherein.

DESCRIPTION OF THE PREFERRED EMBODIMENT OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof) falling within the scope of the appended claims.

Figure 1:
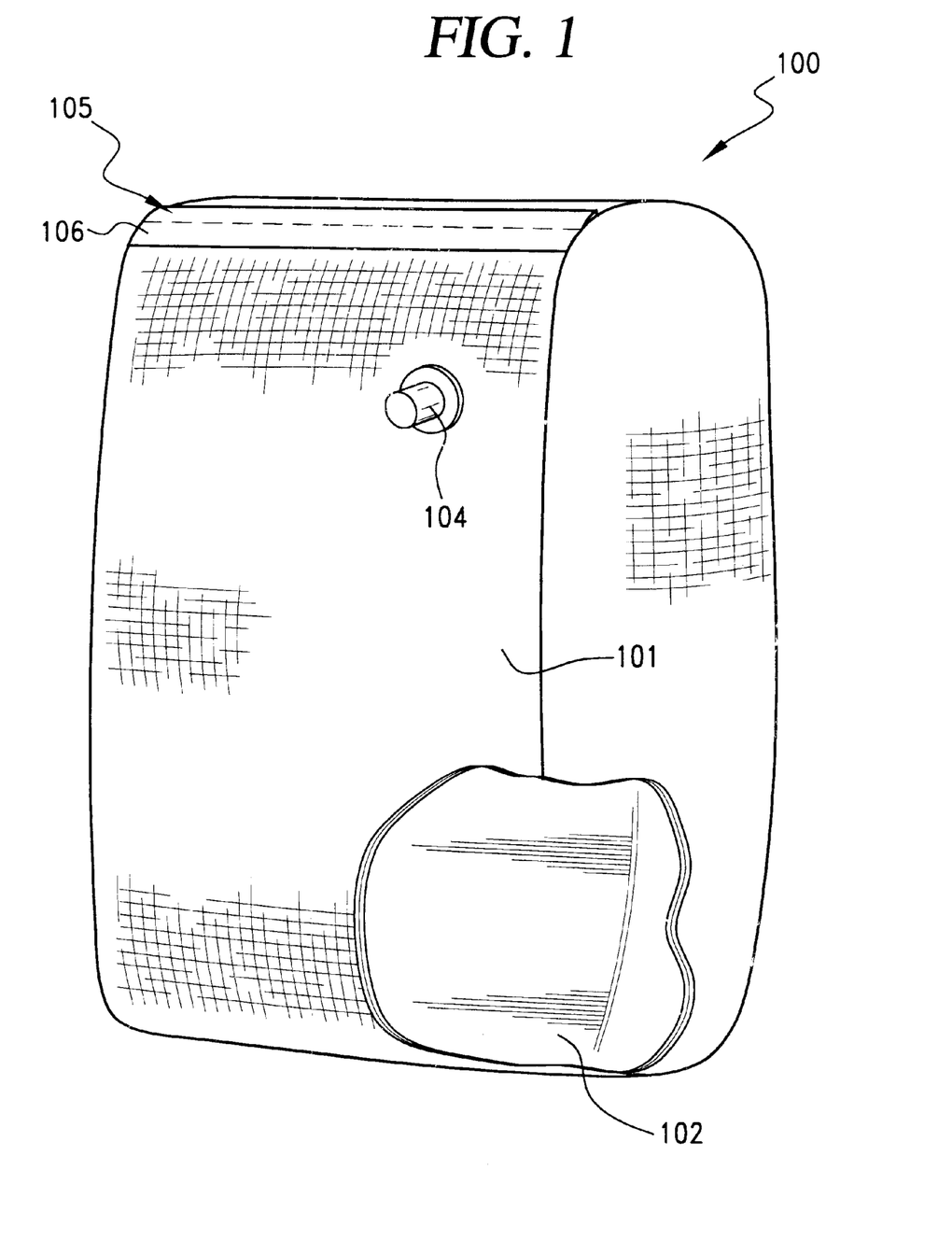
FIG. 1 is a schematic perspective cut-away view of the preferred embodiment of a dunnage bag of the present invention.

The preferred embodiment of the dunnage bag 100 of the present invention is generally characterized in FIG. 1. Outer layer 101 is composed of a woven sleeve of thermoplastic polymer strips, selected for resistance to moisture, stretching, bursting or damage from contract with abrasive surfaces, edges and corners of containers in which goods are shipped, such as polyethylene and polypropylene. In preference such sleeve will be seamless. Such seamless sleeve may be manufactured by circular weaving apparatus, such as that manufactured by Yao Ta Machine Manufacturing Company, or purchased, typically in the form of a long woven sleeve of material which has been flattened and rolled onto a pin or cylinder. Alternatively a sleeve of woven of thermoplastic polymer strips may be formed by overlapping and securing of the edges of the sheet of woven thermoplastic polymers together.

Fusibly joined to the inside of outer layer 101 is a continuous inner layer 102 of a gas impervious thermoplastic polymer, which in preference is of the same composition as outer layer 101. In the preferred embodiment of the invention said continuous inner layer 102 is fused to the exterior of outer layer 101, then the sleeve of fused material is turned "inside-out" so that the continuous inner layer of gas impervious polymer 102 is on the interior of the sleeve and the woven outer layer of polymer 101 is on the exterior of the sleeve.

Figure 2:
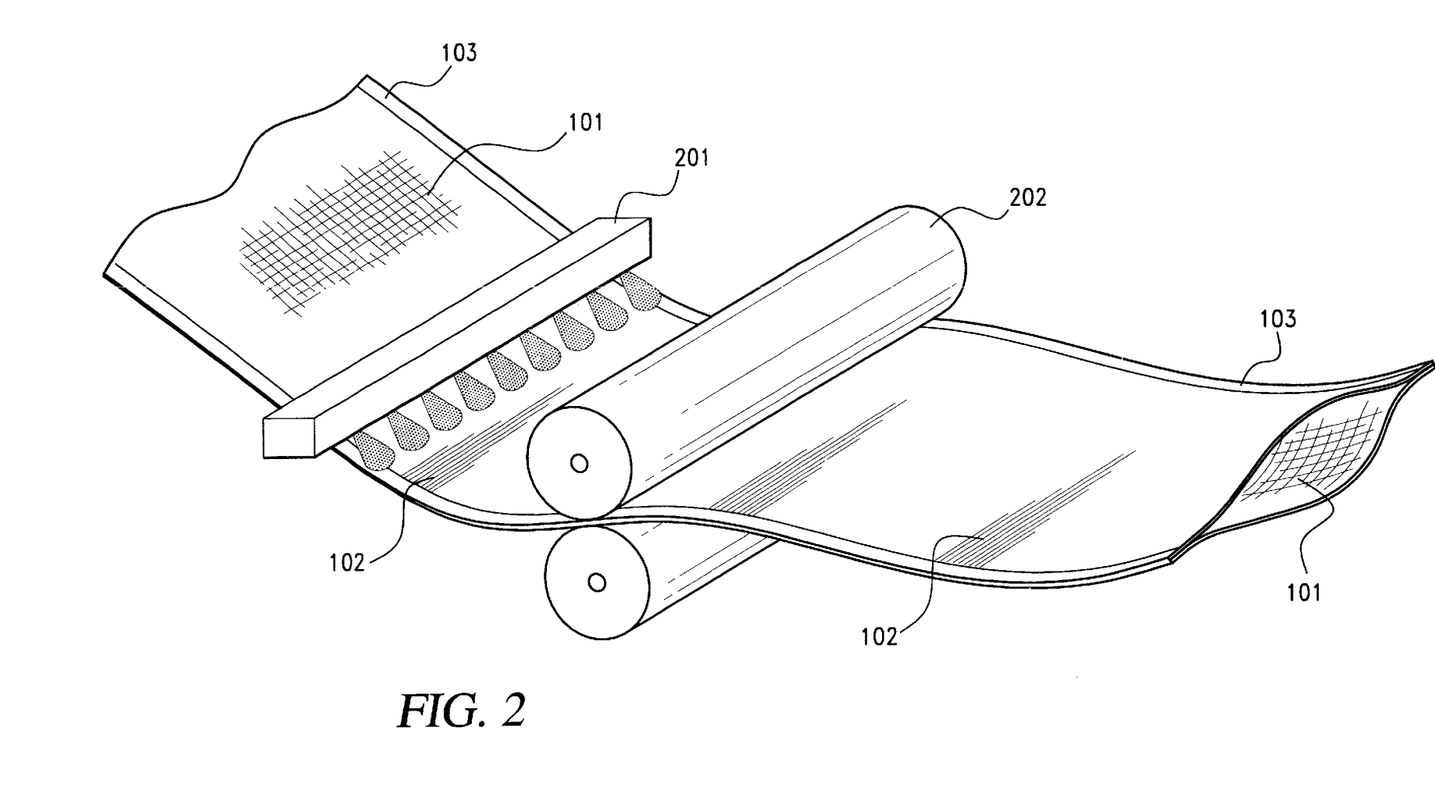
FIG. 2 is a schematic diagram showing a molten sheet of gas impervious thermoplastic polymer being fused to a side of a sleeve woven thermoplastic polymer.

In said preferred embodiment of the invention inner layer 102 is preferably thermally fused to exterior of outer layer 101, which is seamless, in a two-step process. In the first step a length of a flattened sleeve of the woven thermoplastic polymer which will form outer layer 101 is passed through sheet extrusion apparatus 201 of FIG. 2. Said extruder deposits a continuous sheet of the molten thermoplastic polymer of inner layer 102 to a first, preferably the upper, exterior side of the flattened side of woven sleeve 101. In doing so the sheet 102 is extended at least a short distance (in the preferred embodiment approximately 1 centimeter) beyond the lateral edges of the woven sleeve 101, thereby forming flanges 103. Then after deposition of said continuous sheet of material 102 to a first side of woven sleeve 101 the sleeve of material is compressed together, preferably by pinch rollers 202, prior to cooling of the layer of molten polymer. Then, in the preferred embodiment, after passage of the material through pinch rollers 202 the composite material is cooled and may be rolled onto a pin or cylinder (not shown). Then, as is illustrated in FIG. 2, in the preferred embodiment the length of material, which now has a continuous sheet of gas impervious polymer 102 fused to a first side of a flattened sleeve of outer layer 101, is passed again through sheet extrusion apparatus 201 and in similar fashion a second sheet of gas impervious thermoplastic polymer 102 is applied to the second side of said flattened sleeve 101, and to flange 103, thereby creating a long sleeve of woven thermoplastic polymer FIGS. 3 and 4, to the outside of which a continuous layer of gas impervious thermoplastic polymer 102 has been integrally fused by thermal bonding and hot rolling.

Alternatively, the continuous inner layer 102 may be fused to one side of a sheet of woven molten thermoplastic polymer and the sheet rolled into a sleeve (the lateral edges of which are overlapped and secured together) or fused to the inside of a sleeve of woven thermoplastic polymer. However formed, for convenience in handling or storage, said sleeve may be rolled onto a pin or cylinder (not shown). From sleeve of material the dunnage bag of the present invention is formed by the further steps which follow.

Figure 3:
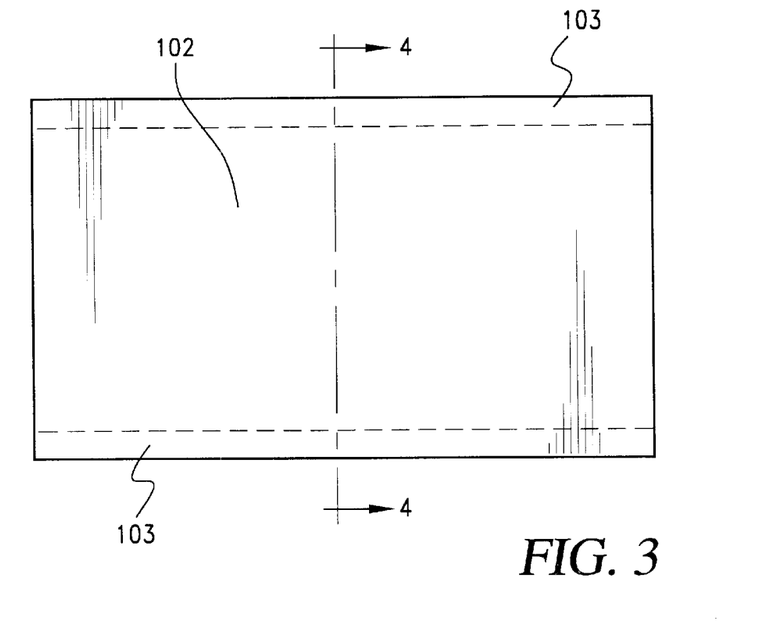
FIG. 3 is a plan view of a section of a sleeve of woven polymer to the exterior of which a continuous layer of gas impervious polymer has been fused.
Figure 4:
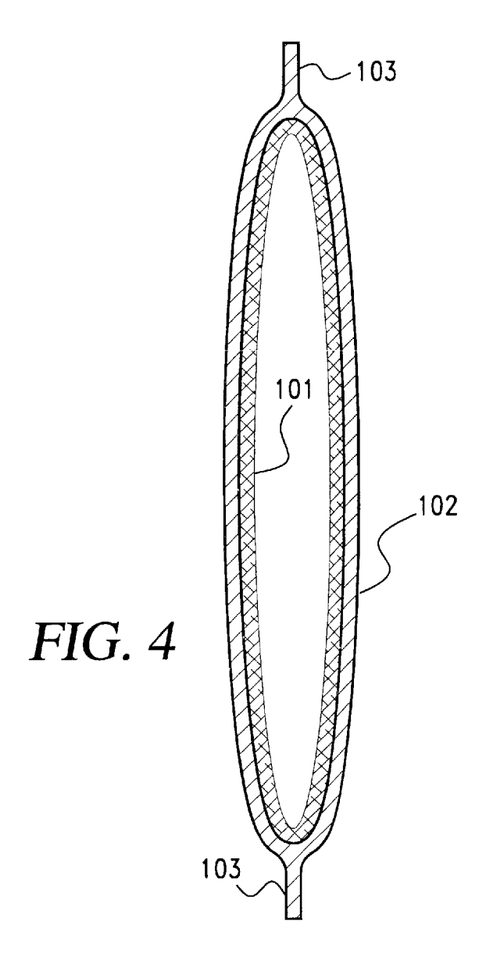
FIG. 4 is a cross-sectional view of the sleeve of FIG. 3.

To complete manufacture of a dunnage bag of the present invention from the sleeve of material shown in FIGS. 3 and 4, four steps remain: cutting a desired length of material from the sleeve, reversal of the inside and outside of the severed length of material (turning said length "inside-out"), installation of a gas valve, and sealing each end of the material in a manner which creates a gas tight seal which is resistant to failure due to internal gas pressure in the bag.

Cutting of a desired length of said sleeve may be done by cold knife, blade, wire or any other conventional manner. In the preferred embodiment of the invention to form a bag of a desired length some excess material is cut to allow for sealing and folding of the ends of the material.

Figure 5:
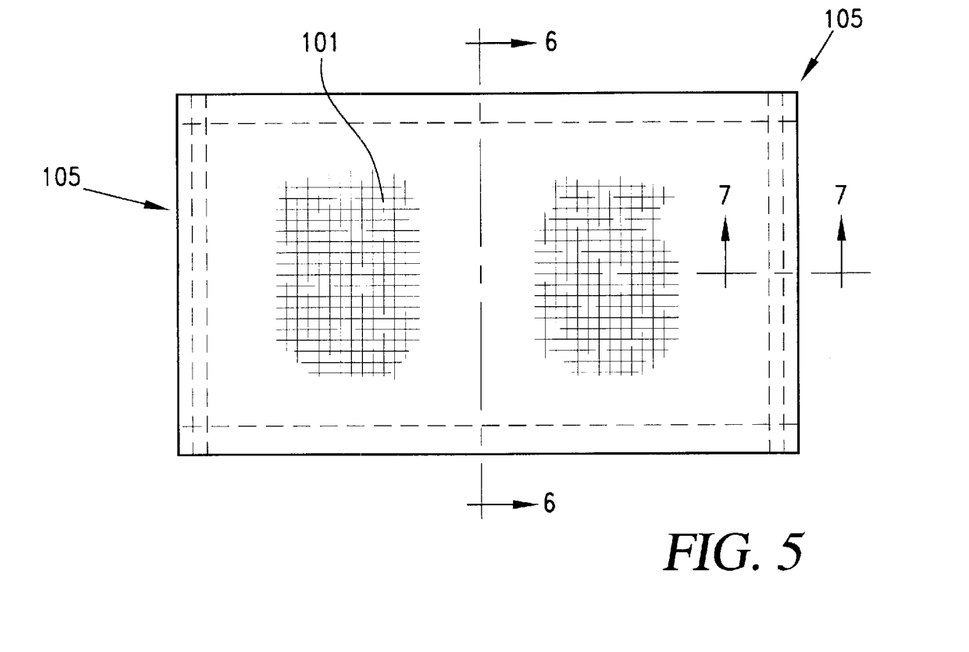
FIG. 5 is a plan view of the sleeve of FIGS. 3 and 4 turned "inside-out".
Figure 6:
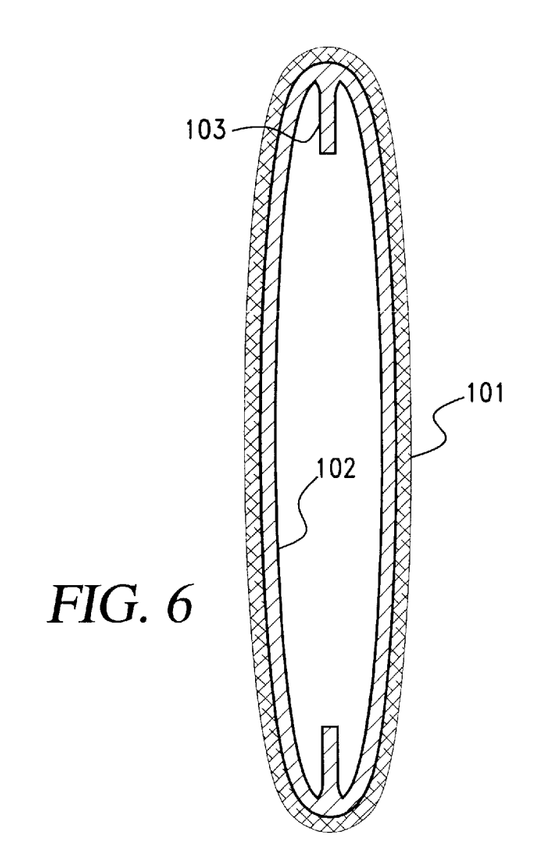
FIG. 6 is a cross-sectional view of the sleeve of FIG. 5.

Once a length of material illustrated in FIGS. 3 and 4 is obtained, if necessary it is then turned "inside-out", so that the woven polymer 101 is on the outside of the sleeve and the continuous layer of gas impervious polymer is on the inside of said sleeve (as is illustrated in FIGS. 5 and 6). Either before or after being turned inside-out a means for admittance of gas, typically a one-way or check valve 104, is installed through the wall of the sleeve, preferably before the ends of the sleeve 105 is sealed (while the gas valve may be installed after sealing of the ends 105 of FIG. 5 it is more difficult to do so). Alternatively the dunnage bag may be equipped any conventional, two-way valve means, or simply an umbilical tube intended to be clamped or tied off after the bag is inflated.

In the preferred embodiment of the invention said gas valve or umbilical tube is comprised of a polymer material of identical or similar composition to the polymers of the outer layer of woven polymer 101 and the continuous layer of gas impervious polymer 102 so as to facilitate recycling the bag. However the bag may also be reused if the bag of the present invention may be both inflated and deflated through such valve. Thus in the preferred embodiment of the invention gas valve 104 is a one way check valve which permits gas pressure to flow into the bag, and by default seals against the release of gas from the bag, such valve may be manually operated to release gas pressure from the bag if desired. Thus the bag of the preferred embodiment of the invention may either be reused or recycled.

Figure 7:
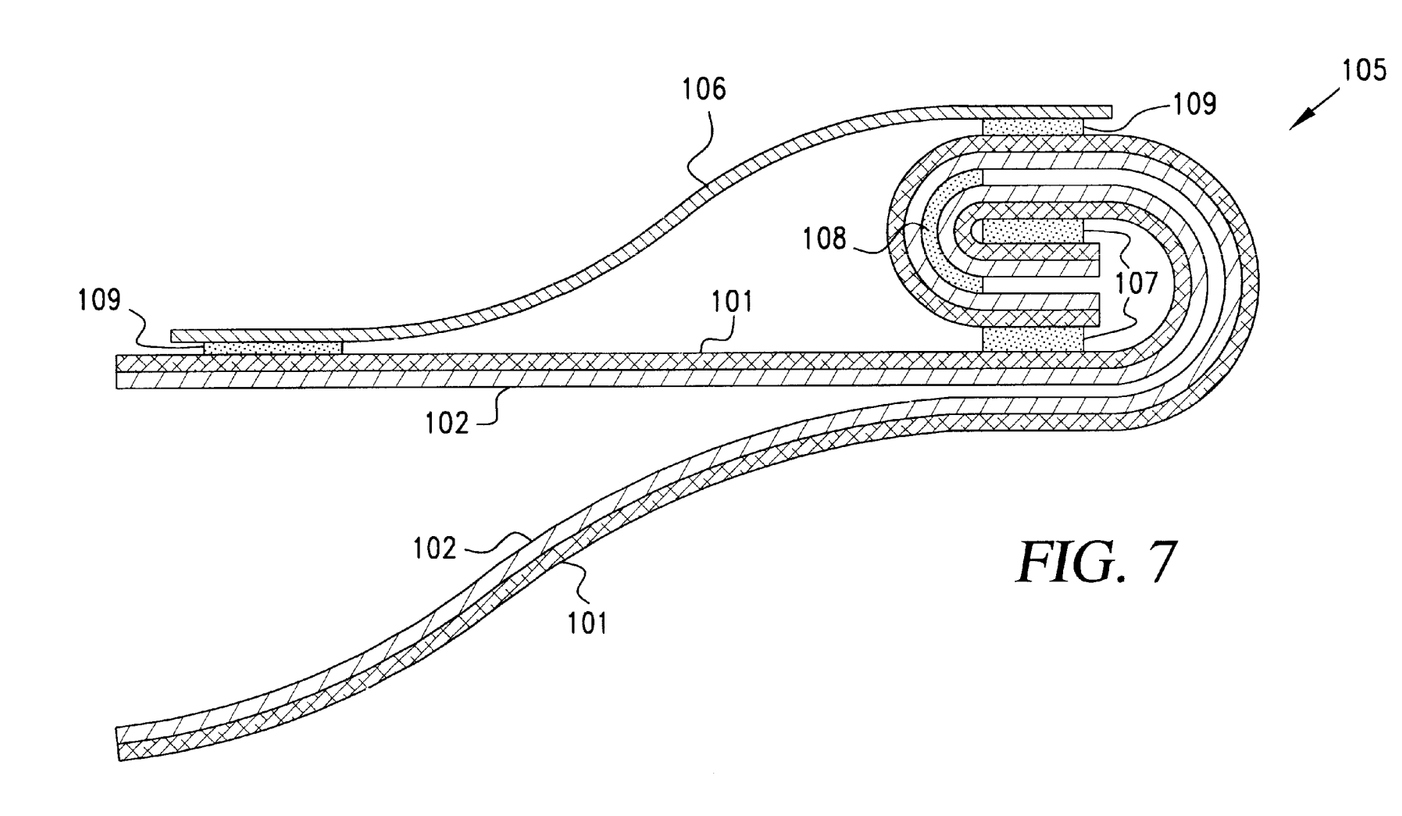
FIG. 7 is a longitudinal cross-sectional view of a double folded and taped end-section of the preferred embodiment of the present invention.
Figure 8:
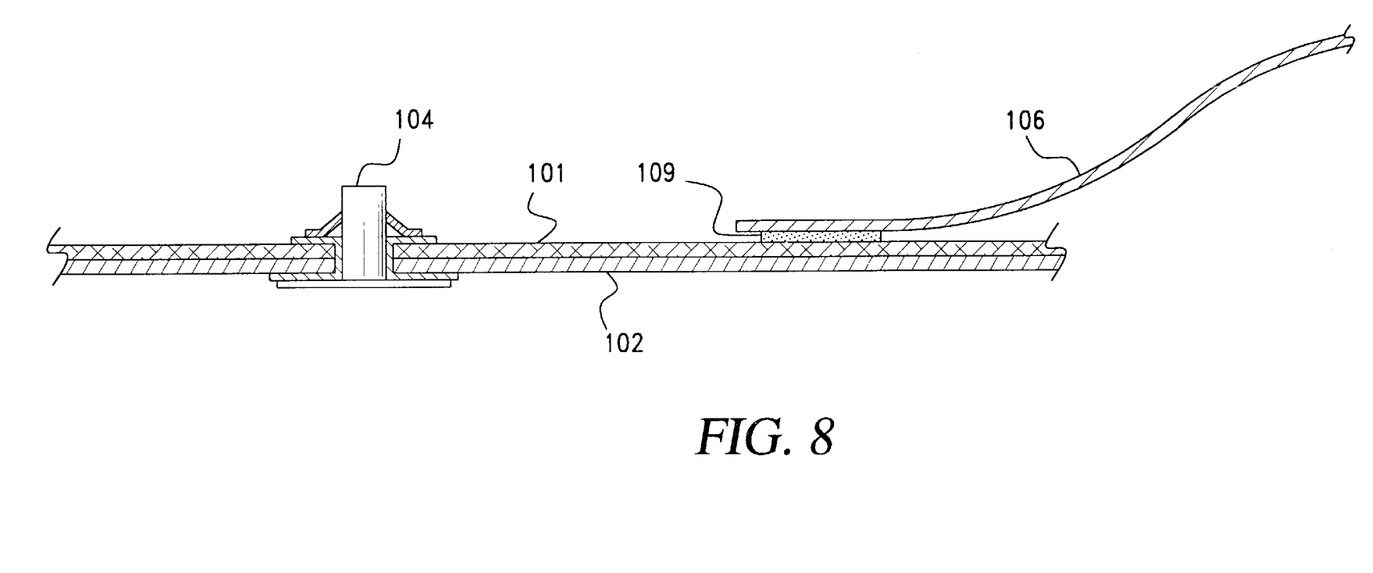
FIG. 8 is a cross-sectional view of the preferred embodiment of the present invention showing installation of a typical gas valve.

After the sleeve of material is turned "inside-out" (so that the woven polymer 101 is on the outside of the bag and the continuous layer of gas impervious polymer 102 is on the inside of the bag) and typically gas valve 104 installed in the wall of the sleeve (as is illustrated in FIG. 8), in the preferred embodiment of the invention the ends 105 of FIG. 5 of the bag are sealed, as is illustrated in FIG. 7. Preferably sealing of the ends of the bag is accomplished running a continuous bead of glue (shown in cross section as 108 of FIG. 7) on the interior of the bag parallel to each cut end 105. Alternatively the interior of the bag may be sealed along a line parallel to each cut end 105 by heat sealing process well known in the art. In order to strengthen the sealed ends of the bag against failure due to internal pressure and to present a bag with a more finished appearance, in the preferred embodiment of the invention the ends of the bag are folded, preferably at least twice, the fold glued or heat sealed at one or both of points 107 of FIG. 7. And to further strengthen the ends of the bag from failure due to the effect of internal pressure and present an even more finished appearance, tape 106 of FIG. 7 may be applied, and bonded to the folds 105 and the exterior of the bag 101 by glue or heat sealing points 109 as is shown in FIG. 7.

Thus the preferred embodiment of the dunnage bag of the present invention is an inflatable structure comprised of a two-ply sleeve comprised of a seamless outer layer of woven thermoplastic polymer 101 selected for resistance to moisture, bursting, abrasion and damage by cargo edges and corners and an integrally fused continuous inner layer of gas impervious, moisture resistant, thermoplastic polymer 102, the ends of which two ply sleeve 105 are sealed against the escape of gas pressure by bonding the interior surfaces of the ends together by glue, heat or a combination of glue and heat, and which may be folded and taped down to the exterior surface of the bag, and, has a valve or umbilical tube means for at least the admittance of gas pressure into said bag.

Thus it may be appreciated that in accordance with the various teachings, disclosures, and principles of the present invention, a new and improved inflatable dunnage bag has been developed which is constructed entirely of polymer material so that the dunnage bag is completely and easily recyclable or may be deflated and reused. The dunnage bag of the present invention is also resistant to water and has a puncture and scuff resistant outer surface and a gas impervious inner layer. The dunnage bag of the present invention also has an improved and superior method for sealing the ends of said dunnage bag so that the dunnage bag is less likely to burst under rigorous conditions. The manufacture of the dunnage bag of the present invention is simple and can be accomplished by means of automated machinery or equipment. The dunnage bag of the present invention is also lightweight, woven thermoplastic materials, such as polyethylene and polypropylene having superior strength than paper bags of equal weight. It is thus to be appreciated that the dunnage bag constructed in accordance with the principles and teachings of the present inventive disclosure constitutes an advancement in the dunnage bag art.

While the above description contains many specificities, these should not be construed as limitations on the scope of the invention, but rather as an exemplification of preferred embodiments thereof. Accordingly, the scope of the present invention should be determined not by the embodiments illustrated, but by the appended claims and their legal equivalents.

What is claimed is:

1. A method of constructing a dunnage bag comprising the following steps:
   a. forming a sleeve of woven strips of thermoplastic polymer;
   b. fusing a continuous layer of gas impervious thermoplastic polymer to the exterior of said sleeve;
   c. turning said sleeve of material inside-out so that the woven strips of thermoplastic polymer are on the exterior of said sleeve and the continuous layer of gas impervious thermoplastic polymer is on the interior of said sleeve;
   d. installing a valve for the admittance of gas into said sleeve; and,
   e. forming a gas impervious seal at each end of said sleeve.

2. The method of claim 1 wherein fusing of the continuous layer of gas impervious thermoplastic polymer to the exterior of said sleeve is accomplished by depositing a molten layer of gas impervious thermoplastic polymer to one exterior side of a flattened sleeve of woven strips of thermoplastic polymer and then to the other side of the flattened sleeve of woven strips of thermoplastic polymer.

3. The method of claim 2 further comprising the step of compressing the sleeve of material together after each step of depositing said molten layer and prior to cooling of said molten layer.

4. The method of claim 3 wherein the step of compressing is accomplished by rolling said sleeve through a pair of pinch rollers.

5. The method of claim 3 further comprising the step of cooling the sleeve immediately after the step of compressing.

* * * * *